United States Patent [19]

Levene

[11] 3,853,674
[45] Dec. 10, 1974

[54] MULTIPLE ION EXCHANGE STEPS FOR STRENGTHENING GLASS AND METHODS OF MAKING SAME

[75] Inventor: Leon Levene, Toledo, Ohio

[73] Assignee: Owens-Illinois Inc., Toledo, Ohio

[22] Filed: Apr. 30, 1973

[21] Appl. No.: 356,072

[52] U.S. Cl. ............................. 161/1, 65/30, 65/60, 65/DIG. 14, 106/38.3, 106/50, 117/124 D
[51] Int. Cl. ...... B44f 1/00, C03c 15/00, C03c 13/00
[58] Field of Search ............ 65/30, DIG. 14, 60, 32; 106/38.3, 50; 117/129, 124 D; 161/1

[56] References Cited
UNITED STATES PATENTS

| | | | |
|---|---|---|---|
| 3,459,673 | 8/1969 | Best et al. | 65/30 X |
| 3,481,726 | 12/1969 | Fischer et al. | 65/30 |
| 3,582,395 | 6/1971 | Adams et al. | 65/30 X |
| 3,640,093 | 2/1972 | Levene et al. | 65/134 X |
| 3,743,491 | 7/1973 | Poole et al. | 65/30 |
| 3,759,683 | 9/1973 | Dislich et al. | 65/DIG. 14 |
| 3,791,808 | 2/1974 | Thomas | 65/30 |
| 3,791,809 | 2/1974 | Lan | 65/30 |
| 3,799,754 | 3/1974 | Thomas | 65/134 |

Primary Examiner—S. Leon Bashore
Assistant Examiner—Frank W. Miga
Attorney, Agent, or Firm—Richard D. Heberling; E. J. Holler

[57] ABSTRACT

A method of strengthening a silicate glass article directed to multiple ion exchange steps is disclosed in which alkali metal ions in the surface layer of the glass are replaced by different alkali metal ions from an external source at elevated temperatures. The external source is an ion exchange medium that is applied to the surface of the glass in the form of a glass precursor that is a cross-linked polymetalloxane that is preferably a polymetallosiloxane or a precursor thereof that is convertible to a gel structure. The steps of applying the glass precursor ion exchange medium and maintaining the medium and the article at an elevated temperature to provide a compressive stress layer in the glass surface are repeated to provide a series of multiple ion exchange reactions, preferably starting with a sodium for lithium ion exchange, followed with a potassium for sodium ion exchange, followed by a rubidium for potassium ion exchange, and finally followed with a cesium for rubidium ion exchange.

11 Claims, No Drawings

MULTIPLE ION EXCHANGE STEPS FOR STRENGTHENING GLASS AND METHODS OF MAKING SAME

THE INVENTION

The present invention is directed to methods of strengthening glass articles and the strengthened articles themselves in which alkali metal ions in the surface layer of the glass are replaced by different alkali metal ions from an external source at elevated temperatures. The external source is an ion exchange medium that is formed from a glass precursor that is a homogenous mixture of metal oxides formed from a cross-linked polymetalloxane having a gel structure.

The present invention more particularly relates to a strengthened glass article and methods of making the same in which there is employed multiple ion exchange steps, each ion exchange step employing an ion exchange medium that is a mixture of homogenous metal oxides formed from a cross-linked polymetalloxane that is preferably a polymetallosiloxane.

In the manufacture of glass articles and particularly in the manufacture of glass containers on high speed production lines, it is desirable to be able to strengthen the containers without slowing down the production line. It is also desirable to use an ion exchange medium for the strengthening of the containers in a form that does not require a prolonged immersion of the container in a molten salt bath—the container being subjected to thermal shock when being introduced into the bath. As is well known, such molten baths are dangerous inasmuch as the accidental introduction of inorganic material, say even a workman's lunch bag, can cause an explosion.

It is also desirable to be able to get a strengthened article such as a container quickly and efficiently so that the compressive stress layer built up on the glass surface has a reasonable depth and at the same time, high strength. It is therefore desirable to be able to provide this compressive stress layer from an alcoholic solution or other suspension material that can be applied to the containers by dipping or spraying rather than an immersion in a molten salt bath.

In addition to the above drawbacks, molten cesium and rubidium salt baths are expensive.

It is an object of the present invention to provide a method of strengthening glass articles, particularly silicate glass articles, by applying to the surface of the glass an ion exchange medium that is a glass precursor comprising a homogenous mixture of metal oxides formed from a cross-linked polymetalloxane that is preferably a polymetallosiloxane or a polysiloxane, and repeating the application of the ion exchange medium at least two times to provide a strengthened glass article having a good depth of penetration for the compressive stress layer and possessing high strength in said layer.

It is an object of the present invention to provide a strengthened glass article and the method of making the same in which alkali metal ions in the surface layer of the glass are replaced by different alkali metal ions from an external source at elevated temperatures by the use of multiple ion exchange steps utilizing an ion exchange medium that is a glass precursor, the method including:

1. applying to the surface of the glass article the glass precursor that is (A) a clear solution of a soluble, further hydrolyzable metalloxane that is preferably metallosiloxane that is capable of being further hydrolyzed to a cross-linked polymetalloxane or polymetallosiloxane that is formed from a metal alkoxide capable of forming the metalloxane such as silicon alkoxide or titanium alkoxide and a precursor of an alkali metal oxide, the alkali metal ion thereof being larger than the alkali metal ion in the glass or (B) a cross-linked polymetalloxane that is preferably polymetallosiloxane having a gel structure;

2. maintaining the glass article and the glass precursor coating at an elevated temperature sufficiently high to convert the metalloxane to a homogenous mixture of metal oxides and maintaining the glass article with the coating thereon at an elevated temperature not substantially above the strain point of the glass for a period of time sufficient to provide a compressive stress layer in the glass article; and 3. repeating the steps 1 and 2 to provide a second ion exchange, the precursor of the alkali metal oxide used in step 1 in the second ion exchange having an alkali metal ion that is larger than the alkali metal ion that was in the glass before the first ion exchange and larger than the alkali metal ion transferred into the glass surface by means of the first ion exchange step.

It is an object of the present invention to provide a strengthened article and the method of making the same in which an ion exchange medium that is a glass precursor formed from a cross-linked polymetallosiloxane to provide a pure, homogenous mixture of metal oxides, the first ion exchange step involving an exchange of potassium ions for sodium ions in the surface of the glass by means of the glass precurose coating, the next ion exchange being an exchange of rubidium ions for the potassium ions in the surface layer of the glass, and the last of the multiple ion exchange steps being an exchange of cesium ions in the glass precursor coating for the rubidium ions in the surface layer of the glass to thereby provide a strengthened glass article.

These and other objects will be apparent from the specification that follows and the appended claims.

The present invention provides a glass article that is strengthened by ion exchange involving multiple ion exchange steps.

The present invention also provides outstanding methods of making strengthened glass articles by multiple ion exchange in which the method involves replacing alkali metal ions in the surface of the glass with different alkali metal ions from an external source that is a glass precursor comprising a pure homogenous mixture of metal oxides at elevated temperatures, the total multiple ion exchange process including the steps of:

1. applying to the surface of the glass article the glass precursor that is (A) a clear solution of a soluble, further hydrolyzable metalloxane that is capable of being further hydrolyzed to a cross-linked polymetalloxane having a gel structure, the polymetalloxane being formed from a metal alkoxide such as a silicon alkoxide, optionally a metal alkoxide such as Al sec. butoxide, and a precursor of an alkali metal oxide, the alkali metal ion of the alkali metal oxide being larger than the alkali metal ion in the glass or (B) a cross-linked polymetalloxane having a gel structure;

2. maintaining the glass article and the glass precursor coating at an elevated temperature sufficiently high to convert the cross-linked metalloxane to a homogenous mixture of metal oxides, continuing to maintain the glass article at the elevated temperature for a period of time sufficient to provide a compressive stress layer in the article, but for a time insufficient to provide an ion exchange to a substantial degree in the interior portion of the glass article; and 3. repeating step 1 (applying the glass precursor coating) and step 2 (maintaining the article at elevated temperatures) to provide a second ion exchange, the precursor of the alkali metal oxide used in step 1 of the second ion exchange having an alkali metal ion that is larger than the alkali metal ion present in the glass before the first ion exchange and also larger than the alkali metal exchanged into the glass by means of the first ion exchange step.

In accordance with the present invention, the multiple ion exchange involves at least two separate successive ion exchange steps using a glass precursor as the ion exchange medium, the glass precursor being a pure homogenous mixture of metal oxides that is convertible to a glass structure or the glass structure itself can be used as the ion exchange medium. Preferably, the multiple ion exchange includes at least three ion exchanges, the alkali metal ion in the glass precursor in the first ion exchange being larger than the alkali metal ion in the glass, the alkali metal ion of the precursor coating of the second ion exchange being larger than the alkali metal ion transferred into the glass in the first ion exchange, and the alkali metal ion of the third ion exchange being larger than the alkali metal ion of the second ion exchange that was exchanged into the glass during the second ion exchange.

Outstanding results have been obtained in which there are four ion exchanges in the multiple ion exchange process, the steps of (1) applying the glass precursor coating to the glass article and (2) maintaining the article and precursor coating at an elevated temperature being repeated at least three times to provide a total of four ion exchanges. As indicated previously, each of the successive alkali metal ions that are exchanged into the glass is larger than the alkali metal ion that was either in the glass to begin with or was exchanged thereinto by the preceding ion exchange step.

An outstanding strengthened article can be produced from a silicate glass article such as a container including bottles and the like, by conducting a first ion exchange in which the lithium ion in the glass article is exchanged with a sodium ion in the glass precursor coating, the next ion exchange step being the exchange of a potassium ion from a precursor coating for sodium ions in the surface of the glass, the next ion exchange step being an exchange of rubidium ions from the glass precursor coating that is a mixture of metal oxides or glass formed from a cross-linked polymetalloxane that is preferably a polymetallosiloxane, for the potassium ions transferred into the surface layer of the glass in the preceding ion exchange to thereby produce the strengthened glass article.

Excellent results have been obtained with the strengthening of silicate glass containers in which the precursor coating provides a glass coating or a pure homogenous mixture of metal oxides having the following approximate composition in percent by weight.

| Ingredient | Percent |
|---|---|
| $SiO_2$ | 20–60 |
| $Al_2O_3$ | 1–5 |
| $B_2O_3$ | 5–10 |
| Alkali metal oxide | 25–75 |

The method of making the glass precursor from a cross-linked polymetallosiloxane and the glass coating on the glass article is described in U.S. Pat. No. 3,640,093 for an invention of Levene and Thomas, which patent is hereby incorporated by reference. Also incorporated by reference for the disclosure of the coating of an inorganic substrate is a United States patent application of Leon Levene, U.S. Ser. No. 210,104 filed Dec. 20, 1971.

Also incorporated by reference is U.S. Pat. application Ser. No. 356,071 filed concurrently herewith, it being an application for an invention of Leon Levene and Ian M. Thomas, Ser. No. 356,071, and being assigned to the same assignee as the present invention.

As described in the Leon Levene/Ian M. Thomas patent application Ser. No. 356,071, a silicate glass article can be strengthened employing a method that comprises the following steps:

1. applying to the surface of the glass a cross-linked polymetalloxane that is preferably a polymetallosiloxane that is the reaction product of (A) a silicon alkoxide of the formula $SiX_nY_{4-n}$ where X is hydrogen, phenyl or alkyl of 1 to 6 carbon atoms, Y is an alkoxy group from 1 to 6 carbon atoms such as methoxy, ethoxy, propoxy and isopropoxy and n is 0 or 1 with less than a stoichiometric quantity of water in the presence of an effective catalytic amount of a hydrolysis catalyst that is preferably an acid hydrolysis catalyst such as HCl so as to form a clear solution of a soluble, partially hydrolyzed silicon alkoxide, (B) reacting the clear solution of the partially hydrolyzed silicon alkoxide with a precursor of an alkali metal oxide such as potassium acetate so as to form a clear solution of a soluble, further hydrolyzable metallosiloxane, (C) reacting the clear solution of step B with an additional quantity of water sufficient to further hydrolyze the metallosiloxane to form a solution that converts to a gel structure containing a cross-linked metallosiloxane, (D) heating the resultant gel structure at a temperature and for a time sufficient to convert the gel structure to an oxide product that is a mixture of highly pure homogenous metal oxides, and (E) optionally converting the mixture of metal oxides to a glass by heat, or else continuing to heat the coating layer as the homogenous mixture of pure metal oxides without converting the product to a glass; and 2. maintaining the glass article and the glass precursor coating formed thereon from the cross-linked metallosiloxane gel structure at a temperature sufficiently high but not above the strain point of the glass for a period of time to provide a compressive stress layer in the glass article, but for a time insufficient to provide ion exchange to a substantial degree in the interior portion of the glass article to thereby produce a strengthened glass article.

This method of coating glass articles, in Ser. No. 356,071, filed Apr. 30, 1973, can be used in the multiple ion exchange process of the present invention.

The metal component is introduced into the polymetalloxane chain or provided as a pendant group thereto by a metal alkoxide such as aluminum sec. butoxide when silicon alkoxide is used to form the metalloxane. Hence metal alkoxides capable of forming the metalloxane are the alkoxides of Si, Ti and Al while the metal alkoxides that introduce metal into the metallosiloxane chain as a pendant group include alkoxides of Zr and Sn as described in greater detail below.

The preferred silicon alkoxide is ethylorthosilicate although other silicon alkoxides such as methyltriethoxysilane, phenyltrimethoxysilane, ethyltriisopropoxysilane and methylorthosilicate can be used.

Suitable titanium alkoxides include titanium methoxide, titanium ethoxide, titanium propoxide, titanium butoxide and titanium neopentoxide and titanium hexoxide. Suitable aluminum alkoxides are aluminum methoxide, aluminum ethoxide, aluminum propoxide, aluminum butoxide, and aluminum hexoxide.

As described, for instance in U.S. Pat. No. 3,640,093, Levene and Thomas—incorporated herein by reference—a metal component can be introduced into the chain of the siloxane or depended from the main chain by means of a metal alkoxide and/or a metal salt. Metal as used herein is defined as comprising the metals listed in the Periodic Table including so-called metal-like elements, e.g., the metalloids. If the metal alkoxide is volatile and easily purified by distillation, it is preferred that the metal be added in this state. Examples of metals which are advantageously added as alkoxides include Al, Ti, Ge, Zr, Hf, Th, V, Nb, B, Ta, Be, Sn and P. When the metals do not form volatile alkoxides, they should be added as metal salts such as nitrates or acetates. Suitable metal salts are salts of Li, Na, K, Rb, Cs, Cu, Mg, Ca, Sr, Ba, Fe, Co, Ni, Zn, Cd, Hg, Pb, Sc, Y, Ce and rare earths La to Lu, inclusive. Other elements such as boron, vanadium, and phosphorus can be added as oxides in aqueous solutions in which they will form their respective soluble acids, e.g., boric acid, vanadium acid, and phosphoric acid. Hence, for ion exchange in accordance with the present invention, the alkali metal nitrates and acetates are preferred with generally the preferred salts being sodium acetate, potassium acetate, rubidium acetate, and cesium acetate.

As set forth in U.S. Pat. No. 3,640,093, the metal salts are used in the form of an aqueous solution generally and include those soluble metal salts which decompose to oxides below 600°C. and which react with metalloxanes that are partially hydrolyzed silicon alkoxides or soluble metallosiloxanes to form a clear solution capable of conversion to a clear gel. Suitable salt solutions are those containing soluble salts of organic acids including benzoic acid or other aromatic acids or fatty acids, alcohol acids, phenol acids and oxalic acids. Suitable soluble salts of other organic acids also include salts of formic, citric, proprionic, tartaric in which the aliphatic acids generally have from 1 to 20 carbon atoms, the aromatic acids having generally from 7 to 15 carbon atoms.

Nitrates of the alkali metals are excellent because the metal nitrates typically decompose to oxides below about 600°C. and leave no undesirable residue such as sometimes is the case of chlorides and sulfates. Carbonates and bicarbonates generally do not leave an objectionable residue.

As set forth in United States patent No. 3,640,093, the clear gel formed from the clear solution is conveniently isolated and/or recovered by suitable means and then appropriately heated so as to remove organic and free liquid components therefrom to form an oxide mixture which is convertible to a glass. Such glass precursors and glasses made by the above method have a very high purity and are homogeneous.

The following examples are intended to illustrate the present invention and not to limit the same.

EXAMPLE 1

Strengthened silicate glass articles were made with a multiple ion exchange of larger alkali metal ions in the glass precursor coating medium for smaller alkali metal ions in the surface of the glass articles. Glass rods were prepared for the glass precursor ion exchange medium, the rods having the following approximate composition by weight.

| Ingredients | Percent by Weight | | |
|---|---|---|---|
| | Composition No. 1 | Composition No. 2 | Composition No. 3 |
| $SiO_2$ | 67.7 | 68.5 | 59.4 |
| $Al_2O_3$ | 2.8 | 19.4 | 18.1 |
| $Na_2O$ | 15.6 | 0.5 | 13.2 |
| CaO | 5.6 | — | — |
| MgO | 4.0 | — | 2.1 |
| $B_2O_3$ | 1.5 | — | 3.5 |
| $K_2O$ | 0.6 | — | 3.8 |
| BaO | 2.0 | — | — |
| $Li_2O$ | — | 3.9 | — |
| ZnO | — | 2.0 | — |
| $TiO_2$ | — | 1.8 | — |
| $ZrO_2$ | — | 1.4 | — |
| Properties | | | |
| Annealing Point °F. | 978 | 1210 | 1075 |

Coating solutions for the above-described rods were prepared from a metal alkoxide and metal acetate mixture which produced, upon hydrolysis and thermal degradation as previously described, glass precursor coatings that were a homogenous mixture of metal oxides having the following approximate general compositional ranges:

| Ingredients | Percent by Weight |
|---|---|
| $SiO_2$ | 20–60 |
| $Al_2O_3$ | 1–5 |
| $B_2O_3$ | 5–10 |
| Alkali metal oxide | 25–75 |

A specific coating solution that was prepared was made by mixing and heating at 75°C. for 20 minutes 22.2 grams (0.107 moles) ethylorthosilicate, 25 ml. ethanol, 1.29 grams (0.107 moles) water and 2 drops 1 N HCl. A clear, warm solution resulted and 2.0 grams (0.0098 mole) of aluminum isopropoxide was added thereto. An exothermic reaction took place and the solution cleared within several minutes. In order to supply boron oxide into the glass precursor coating, 1.9 grams (0.0273 mole) $B_2O_3$ which had been previously dissolved by heating in a mixture of n-butanol (30 ml.) and glacial acetic acid (20 ml.). Thereafter, the precursor of the alkali metal oxide, namely potassium acetate, was added in an amount of 15.6 grams (0.081 mole), it first being dissolved in 60 mls. of water with some heating.

The resultant clear solution was used for coating glass rods above described. In some cases, the clear solutions were gelled and the gel dispersed in a liquid for instance by stirring vigorously in a polar solvent such as methanol or ethanol for several minutes. Similar solutions have been observed to gel within a time of about 5 minutes to several hours, depending on the formulation. Excellent results were obtained with a gel dispersion which is quite stable and easily applied as a coating to the glass rods. The glass rods, having the formulation as previously described were cleaned by heating at 300°–350°C. for several hours. The rods were cooled and then dipped into the above-described gel dispersions or dipped into a clear coating solution as above described and the rods then allowed to dry for 10 minutes. In some cases, a second coating was placed on the rods to obtain a continuous film and the initial layer of film was not fully continuous.

In order to remove solvents, the rods were placed in a 130°C. oven. Generally the coatings on the rods remained uniform and continuous and generally they were heated in a non-draft oven for the required treatment time until substantially most of the solvents were removed.

The coatings were converted to high purity, homogenous mixtures of oxides in the above-described heat treatment in a non-draft oven. In most cases, the coatings after this treatment ranged in color from light tan to black. The resultant rods were heated with the glass precursor coating, now in the form of a homogenous mixture of metal oxides, at 800°F. to form a high strength compressive surface layer on the glass rod.

| Comp. No. | Treatment Time (Hrs.) | Temp. °F. | Modulus of Rupture (psi) |
|---|---|---|---|
| 1 | 4 | 800 | 34,000 |

Rods of Composition No. 1 were run as blanks with the same heat treatment but containing no glass precursor coating, they having a modulus of rupture of 17,100 psi, this being an average of at least three samples.

All test results are the average of at least three samples.

EXAMPLE 2

Rods of Composition No. 1 were coated with a glass precursor solution as above described except that rubidium acetate was used in place of potassium acetate in a single ion exchange step. The precursor coating after an ion exchange heat treatment of 800°F. for 14 hours was washed off. The results obtained were as follows:

| Exchange Couple | Heat Treatment Time (Hrs.) | Temp. °F. | Modulus of Rupture (psi) |
|---|---|---|---|
| Rb+Na+ (single exchange) | 14 | 800 | 41,000 |

It can be seen from Example 3 (which follows) that strength improvement in the order of around 500 percent in the modulus of rupture can be obtained over untreated rods and that successive ion exchanges contribute significantly to the overall strengthening of the glass rods.

EXAMPLE 3

Rods of Composition No. 1 which were strengthened in a single ion exchange step as described in Example 1 were again strengthened in a second ion exchange step using a glass precursor coating as described in Example 1 except that rubidium acetate was used in place of potassium acetate. The rods were washed and dried after the first ion exchange step and then recoated with the glass precursor coating containing rubidium acetate. The results were as follows:

| Heat Treatment (Hrs.) | Temperature °F. | Modulus of Rupture (psi) |
|---|---|---|
| 14 | 800 | 79,000 |

It can be seen that the double ion exchange produced about twice the modulus of rupture values as the single ion exchange step of Example 1.

A thin slice of the above-described double exchanged rods was examined under a petrographic microscope and it showed two distinct compression layers. One layer apparently due to the $K^+$ for $Na^+$ exchange was 14 microns deep, and surrounding this layer was a second intense high strength compression ring of about 4 microns in depth, apparently due to the rubidium for potassium ion exchange.

EXAMPLE 4

Glass rods of Composition No. 2, containing lithia in the composition, were coated with a sodium containing (57 weight percent $Na_2O$) precursor coating in which $Na_2O$ was formed from sodium acetate. The coated

| Exchange Couple | Heat Treatment | | Depth (Microns) | | | | Modulus of Rupture, psi |
|---|---|---|---|---|---|---|---|
| | Time (hrs.) | Temp. °F. | Na | K | Rb | Cs | |
| Na-Li | 0.5 | 750 | 100 | — | — | — | 39,000 |
| K-Na | 1.0 | 800 | 300 | 12 | — | — | 45,000 |
| Rb-K | 16.0 | 800 | — | 20 | 3 | — | 66,000 |
| Cs-Rb | 16.0 | 800 | — | — | 21 | 3 | 77,000 | rods were treated as described in the previous example. Multiple ion exchange steps were conducted on the rods with successive treatments with $K_2O$, in the precursor coating, then $Rb_2O$ in the precursor coating, and finally $Cs_2O$ (57 percent by weight of the mixture of oxides). The results and the conditions of heat treatment for the ion exchanges are set forth below. All Modulus of Rupture values represent the average value of at least three rods.

Rods of Composition No. 2 were run as blanks undergoing the same heat treatment but containing no precursor coating and hence not undergoing an ion exchange. The modulus of rupture of the blank rods averaged 15,200. It can be seen that outstanding results are obtained easily and efficiently by multiple ion exchange treatments involving the application to the glass surface of an ion exchange medium comprising a pure homogenous mixture of metal oxides.

Number 3 glass rods were ion exchanged using multiple ion exchanges as described in the previous example. Outstanding strengthened rods were produced with the multiple ion exchange being easily adapted to high speed production lines.

The modulus of rupture results were obtained with a Tinius-Olson testing machine using a 4-point loading as described, for instance, in the Graham U.S. Pat. No. 3,473,906 and the Grubb and LaDue U.S. Pat. No. 3,498,773, which are incorporated by reference.

Other metal organic coatings containing an alkali metal oxide precursor from an alkali metal salt such as potassium acetate, potassium nitrate, etc. can be used to prepare outstanding ion exchange media containing great purity and homogeneity. The resultant rods are strengthened readily without the use of hazardous molten salt bath which also provides the danger of breakage of the glass articles due to thermal shock. Other solutions of metal salts (that decompose below 600°C.) that can be used in place of the particular salts of acetates shown in the examples to provide substantially equivalent results are potassium nitrate, rubidium nitrate, cesium carbonate, cesium nitrate, cesium formate and cesium tartarate as previously described.

Metal organic coatings containing an alkali metal oxide precursor that provides a mixture of alkali metal ions such as rubidium and potassium in the ion exchange medium can be used to produce outstanding strengthened glass articles. Hence, a metal organic coating using an alkali metal oxide precursor that is a mixture of potassium acetate and rubidium acetate provides excellent results with a single ion exchange heat treatment as described in application Ser. No. 356,071.

The resultant rods as well as other articles were strengthened according to the multiple ion exchanges of the present invention without the use of a hazardous molten salt bath which presents a danger of breakage of the glass articles due to thermal shock, particularly in high speed production lines.

What is claimed is:

1. In a method of strengthening a silicate glass article containing alkali metal ions in which the alkali metal ions in the surface layer of the glass are replaced by different alkali metal ions from an external source at elevated temperatures not substantially above the strain point of the glass of the article, in which the silicate glass article is coated with a glass precursor that forms a homogeneous mixture of metal oxides as the ion exchange medium by:
   1. applying to the surface of the glass article a first glass precursor that is (A) a clear solution of a soluble, further hydrolyzable metallosiloxane that is capable of being further hydrolyzed to a cross-linked polymetallosiloxane, the soluble, further hydrolyzable metallosiloxane being formed from a silicon alkoxide and a precursor of an alkali metal oxide, the alkali metal ion thereof being larger than the alkali metal ion in the glass; and
   2. maintaining the glass article and the glass precursor coating at an elevated temperature sufficiently high to convert the metallosiloxane to a homogenous mixture of metal oxides and maintaining the glass article with the coating thereon at an elevated temperature not substantially above the strain point of the glass article for a period of time sufficient to provide a compressive stress layer in the glass article; the improvement comprising the steps of:
   a. applying to the surface of the glass article having the stress layer, a second glass precursor, the second glass precursor having an alkali metal ion that is larger than the alkali metal ion that was in the first glass precursor, the second glass precursor being a clear solution of insoluble, further hydrolyzable metallosiloxane that is capable of being further hydrolyzed to a cross-linked polymetallosiloxane, the further hydrolyzable metallosiloxane being formed from a silicon oxide in a precursor of an alkali metal ion, the alkali metal ion thereof being larger than the alkali metal ion in the first glass precursor and the glass; and
   b. maintaining the glass article and the second glass precursor coating at an elevated temperature sufficiently high to convert the metallosiloxane to a cross-linked polymetallosiloxane that is converted to a homogenous mixture of metaloxides, the maintaining of the glass article with the second precursor coating thereon being at an elevated temperature not substantially above the strain point of the glass article for a period of time sufficient to form a second compressive stress layer in the glass article to thereby produce a strengthened glass article.

2. A method as defined in claim 1 in which the strengthened article is further strengthened by applying a third glass precursor to the glass surface of the article to form a coating thereon, the third precursor containing an alkali metal oxide having an alkali metal ion that is larger than the alkali metal ion in the second glass precursor, the glass article and the third precursor coating being maintained at an elevated temperature sufficiently high to convert the glass precursor coating to a mixture of metal oxides and not substantially above the strain point of the article for a period of time sufficient to form a compressive stress layer from the third precursor coating in the glass article to provide a strengthened article.

3. A method as defined in claim 2 in which the article is further strengthened by the following steps:
   c. applying a fourth glass precursor to the glass surface of the article to form a coating thereon, the fourth precursor containing an alkali metal oxide having an alkali metal ion that is larger than the alkali metal ion in the third glass precursor; and
   d. maintaining the glass article and the fourth precursor coating at an elevated temperature sufficiently high to convert the glass precursor coating to a mixture of metal oxides and at a temperature not substantially above the strain point of the article for a period of time sufficient to form a compressive stress layer in the glass article from the fourth precursor coating to provide a strengthened article.

4. A method as defined in claim 3 in which the first ion exchange is an exchange of a sodium ion in the homogenous mixture of metal oxides formed from the first precursor for a lithium ion in the glass surface layer of the article, the next ion exchange step is an exchange of potassium ions for sodium ions in the surface of the glass, the next ion exchange step is an exchange of rubidium ions for the potassium ions in the surface layer of the glass, and the last of the multiple ion exchange steps is an exchange of cesium ions for the rubidium ions in the surface layer of the glass to thereby provide a strengthened glass article.

5. A method as defined in claim 1 in which the first and second glass precursors are a mixture of metal oxides having the following approximate composition in percent by weight:

| Ingredient | Percent |
|---|---|
| $SiO_2$ | 20 – 60 |
| $Al_2O_3$ | 1 – 5 |
| $B_2O_3$ | 5 – 10 |
| Alkali metal oxide | 25 – 75 |

6. A method as defined in claim 5 in which the alkali metal oxide of the second ion exchange step is $K_2O$.

7. A method according to claim 3, the first, second, third and fourth glass precursors providing a glass coating of the following composition:

| Ingredient | Percent by Weight |
|---|---|
| $SiO_2$ | 20 – 60 |
| $Al_2O_3$ | 1 – 5 |
| $B_2O_3$ | 5 – 10 |
| Alkali metal oxide | 25 – 75 | the alkali metal oxides being used being $Na_2O$, $K_2O$, $Rb_2O$ and $Cs_2O$, the alkali metal oxides being used successively in the four ion exchange steps, the smallest alkali metal ion, $Na_2O$, being used first and the largest alkali metal ion, $Cs_2O$, being used in the last of the multiple ion exchange steps.

8. A method as defined in claim 5 in which the silicon alkoxide is ethylorthosilicate and the precursor of an alkali metal oxide is an alkali metal acetate.

9. A method as defined in claim 8 in which the alkali metal acetate includes rubidium acetate.

10. A method as defined in claim 8 in which the alkali metal acetate includes cesium acetate.

11. A glass article made according to the process defined in claim 1.

* * * * *